US006251324B1

United States Patent
Forte et al.

(10) Patent No.: US 6,251,324 B1
(45) Date of Patent: Jun. 26, 2001

(54) APPLICATOR FOR APPLYING SEALANT ONTO A GLASS BLOCK AND METHOD OF USE

(75) Inventors: Paul R. Forte, Bloomfield Hills; Robert E. Fox, Saint Clair Shores, both of MI (US)

(73) Assignee: Trend Products, Inc., Warren, MI (US)

( * ) Notice: Subject to any disclaimer, the term of this patent is extended or adjusted under 35 U.S.C. 154(b) by 0 days.

(21) Appl. No.: 09/401,845

(22) Filed: Sep. 22, 1999

(51) Int. Cl.[7] .................................................. B29C 47/02
(52) U.S. Cl. ........................ 264/260; 425/87; 425/113; 425/464
(58) Field of Search .................................. 264/252, 260, 264/87; 425/87, 121, 113, 464

(56) References Cited

U.S. PATENT DOCUMENTS

| 823,593 | 6/1906 | Fisher | 249/53 R |
|---|---|---|---|
| 1,423,316 | 7/1922 | Giovagnoli | 249/53 R |
| 1,679,007 | 7/1928 | Reagan | 249/53 R |
| 1,864,176 * | 6/1932 | Baker | 425/87 |
| 2,403,335 | 7/1946 | Bortolotti | 249/53 R |
| 3,669,585 * | 6/1972 | Krupp | 425/113 |
| 3,888,454 | 6/1975 | Treadaway | 249/90 |
| 3,957,406 * | 5/1976 | Battersby | 425/87 |
| 4,053,269 | 10/1977 | Levy | 425/113 |
| 5,266,019 * | 11/1993 | Farber | 425/113 |
| 5,362,428 * | 11/1994 | Tsujino et al. | 264/252 |
| 5,368,461 * | 11/1994 | Murphy | 425/87 |
| 5,558,828 | 9/1996 | Yada et al. | 264/252 |
| 5,632,939 | 5/1997 | Ito et al. | 425/113 |
| 5,645,785 | 7/1997 | Gornils et al. | 264/252 |
| 5,890,335 * | 4/1999 | Fox | 52/306 |

\* cited by examiner

Primary Examiner—Robert Davis
(74) Attorney, Agent, or Firm—Hall, Priddy, Myers & Vande Sande

(57) ABSTRACT

An applicator for applying streams of a sealant onto a glass block and a method for applying streams of a sealant onto a glass block. The applicator is guided manually along the edges of the vertical surfaces of the glass block, while the sealant is being dispensed onto it, thereby accurately positioning the correct amount of the sealant at the intended location along the edges onto the vertical surfaces. The applicator can be easily used on-site and is appropriate for sealing glass blocks to obtain oddly shaped or oddly sized glass walls.

9 Claims, 2 Drawing Sheets

APPLICATOR FOR APPLYING SEALANT ONTO A GLASS BLOCK AND METHOD OF USE

FIELD OF THE INVENTION

This invention relates to devices for applying a sealant to glass blocks and methods using these devices when building glass block panels or walls. More particularly, this invention relates to applicators for applying sealant to a selected portion of glass blocks, and to methods for applying the sealant when building glass block panels or walls.

BACKGROUND OF THE INVENTION

In the construction of glass block panels or walls, mortar or silicone sealant can be used to secure glass blocks to each other. Mortar poses several problems in its application onto glass blocks. It is difficult properly apply the correct amount of mortar needed to secure the glass blocks to each other. If too little mortar is used or it is improperly located the bond formed between mortar and glass is often inadequate. Mortar has a tendency to crack and become unsightly. Problems are known to occur when the glass blocks are improperly placed onto each other, causing the mortar to be squeezed out and the glass blocks to become misaligned. Mortar is often hand applied and its application, to make it reasonably sightly, is labor intensive and thus expensive.

In an attempt to mitigate these problems when mortar is used, silicone has been substituted. Silicone has been found to bond better with glass than mortar and to provide a more flexible bond, thus reducing the possibility the bond would crack. Along with the change to silicone, different methods and devices for applying silicone were developed. These methods include constructing glass wall panels in a controlled setting where integral spacers between the glass blocks are used to assure proper alignment of the glass blocks. Such methods are disclosed in U.S. Pat. No. 5,448,864 issued to Rosamond and U.S. Pat. No. 5,485,702 issued to Sholton.

Another highly effective apparatus and method for constructing glass walls in a controlled setting is disclosed in U.S. patent application Ser. No. 08/873,127 filed on Jun. 11, 1997, and now U.S. Pat. No. 5,890,335, by Fox. The apparatus used includes a spacing rack for positioning glass blocks in a properly spaced alignment and automatic, controlled application rods for the silicone sealant.

Devices and methods for extrusion of resins on the peripheral edges of glass panels are known in the art. One such method for forming moldings (trims) on glass panels is disclosed in U.S. Pat. No. 5,558,828 to Yada et al. In this method two glass panels and an extrusion die are moved relative to each other, so that a flange of a synthetic resin or rubber is formed, thereby joining both panels. A device, disclosed in U.S. Pat. No. 5,645,785 to Cornilis et al., is used in a process of manufacturing an automobile pane, where a polymer frame is extruded on the pane while the pane is being moved through a recess in an extrusion head. Alternatively, a molding may be formed on a peripheral edge of a horizontal article while either the extrusion die or the article is being moved, as in U.S. Pat. No. 5,632,939 to Ito et al.

Hand tools known in the art include devices used to evenly apply a mortar layer on building units, including glass blocks. Such devices are disclosed in U.S. Pat. No. 823,593 issued to Fisher and U.S. Pat. No. 2,403,335 issued to Bortolotti. They are not helpful, however, in providing a properly controlled amount of a sealant, such as silicone, in a form of a stream, as is needed when glass blocks are being sealed.

None of these prior art apparatii or methods are truly helpful, when there is a need, on-site, to build a mortarless glass wall, and especially when the construction conditions will not allow for use of spacers or a spacing rack, or if the major part of the wall is already built and there remains only an oddly shaped or sized part of the wall to be built. Similarly, none of these devices and methods adequately allow for supplementing the automated devices and methods in the construction plant when an odd sized or shaped glass wall needs to be built.

In view of the above it is apparent there exists a need in the art for a device and a method that can be used to build a regular or an oddly shaped or sized glass block wall on-site or to supplement automated devices and methods of building glass walls under controlled conditions, when the stream of sealant, such as silicone, is accurately and in an appropriate amount placed along the edges of the glass blocks to be sealed, without highly intensive and expensive labor skills being involved.

SUMMARY OF THE INVENTION

Generally speaking this invention provides an applicator capable of continuously applying a stream of a sealant on one of four vertical surfaces of a glass block and along each opposing edge of a glass block comprising two horizontal surfaces and four vertical surfaces, wherein said edges are formed respectively by each horizontal surface and each vertical surface perpendicular to said each horizontal surface, comprising:

a first planar surface having a first end and a second end, the first planar surface having a length substantially the same as the width of the each vertical surface of said glass block to which the sealant is to be applied;

a second planar surface parallel to the first planar surface, having a first end and a second end; an entrance orifice defined by the second surface, for receiving the source of the sealant;

an enlarged chamber for accommodating the source of the sealant, extending from the entrance orifice substantially downwardly below the second planar surface;

a sealant receiving orifice in flow communication with the enlarged chamber, opposite the entrance orifice;

a first vertical surface extending substantially downwardly from the first end of the second planar surface;

a second vertical surface extending substantially downwardly from said second end of said second planar surface;

a connecting channel having a first end portion and a second end portion, extending from the first vertical surface to the second vertical surface;

a connecting channel orifice in flow communication with the connecting channel, substantially centrally located within the connecting channel;

a sealant receiving channel extending from the sealant receiving orifice to the connecting channel orifice;

at least two delivering channels extending outwardly from the connecting channel;

at least two delivering orifices in flow communication with the two delivering channels;

a leading surface extending substantially vertically and downwardly from the second planar surface and substantially perpendicularly to the first and the second vertical surfaces;

at least two grooves in flow communication with the at least two delivering orifices, said two grooves defined by the first planar surface and the leading surface, the grooves so located with respect to the first end and the second end of the first planar surface, that the distance of the each groove respectively from the first end and the second end of the first planar surface is substantially equal to the distance of the plane of the edge of the horizontal surface of the glass block from the plane of the edge most near it, on which the sealant is to be applied, parallel to the horizontal surface;

and a third and a fourth substantially vertical surface respectively extending downwardly from the first end of the first planar surface and the second end of the first planar surface to guide the applicator along the opposing edges of the glass block, as to accurately position the stream of the sealant at the intended location of application by manually sliding the applicator along the each two opposing edges of the glass block.

In certain embodiments of this invention the applicator further includes a first and second removable closing cap, fitted respectively into the first and the second ends of the connecting channel which allow the applicator to be internally cleaned at the end of a particular application or other convenient time. In still further embodiments of this invention the entrance orifice is substantially circular and the two delivering orifices are substantially oval.

This invention also provides a method for applying a stream of a sealant on one of four vertical surfaces of a glass block, along each of two opposing edges of a glass block comprising two horizontal surfaces and four vertical surfaces, wherein the edges are formed by respectively each horizontal surface and each vertical surface perpendicular to the each horizontal surface, comprising the steps of:

a) providing the one vertical surface of a glass block, on which the sealant is to be applied;

b) providing a source of a sealant;

c) providing an applicator, comprising a first planar surface having a first end and a second end; a second planar surface parallel to the first planar surface, the second planar surface having a first end and a second end; a first vertical surface extending substantially downwardly from the first end of the second planar surface; a second vertical surface extending substantially downwardly from the second end of the second planar surface; a leading surface extending substantially vertically and downwardly from the second surface and substantially perpendicularly to the first and second vertical surfaces, wherein the first planar surface and the leading surface define at least two grooves that are in flow communication with the at least two orifices for dispensing the sealant onto the vertical surface of the glass block, the grooves so located with respect to the first end and the second end of the planar surface, that the distance of the each groove respectively from the first end and the second end of the first planar surface is substantially equal to the distance of the plane of each horizontal surface of the glass block from the plane of the edge most near it and parallel to the horizontal surface; an enlarged chamber for accommodating the source of the sealant, the enlarged chamber in fluid communication with an entrance orifice defined by the second planar surface and with a sealant receiving orifice that is connected to the at least two orifices for dispensing the sealant through a sealant receiving channel, a connecting channel, and at least two delivering channels; the applicator comprising a third and fourth substantially vertical surface respectively extending downwardly from the first end of the first planar surface and the second end of the first planar surface, to guide the applicator along the opposing edges of the glass block;

d) coupling the source of the sealant to the enlarged chamber of the applicator; and e) dispensing the sealant onto the sealant receiving orifice and simultaneously manually sliding the applicator along the opposing edges of the glass block, thereby accurately positioning the correct amount of the sealant along the each two opposing edges of the glass block.

This invention will now be described with respect to certain embodiments thereof as set forth in the accompanying illustrations, wherein:

IN THE DRAWINGS

DESCRIPTION OF CERTAIN EMBODIMENTS OF THE INVENTION

Figure 1:
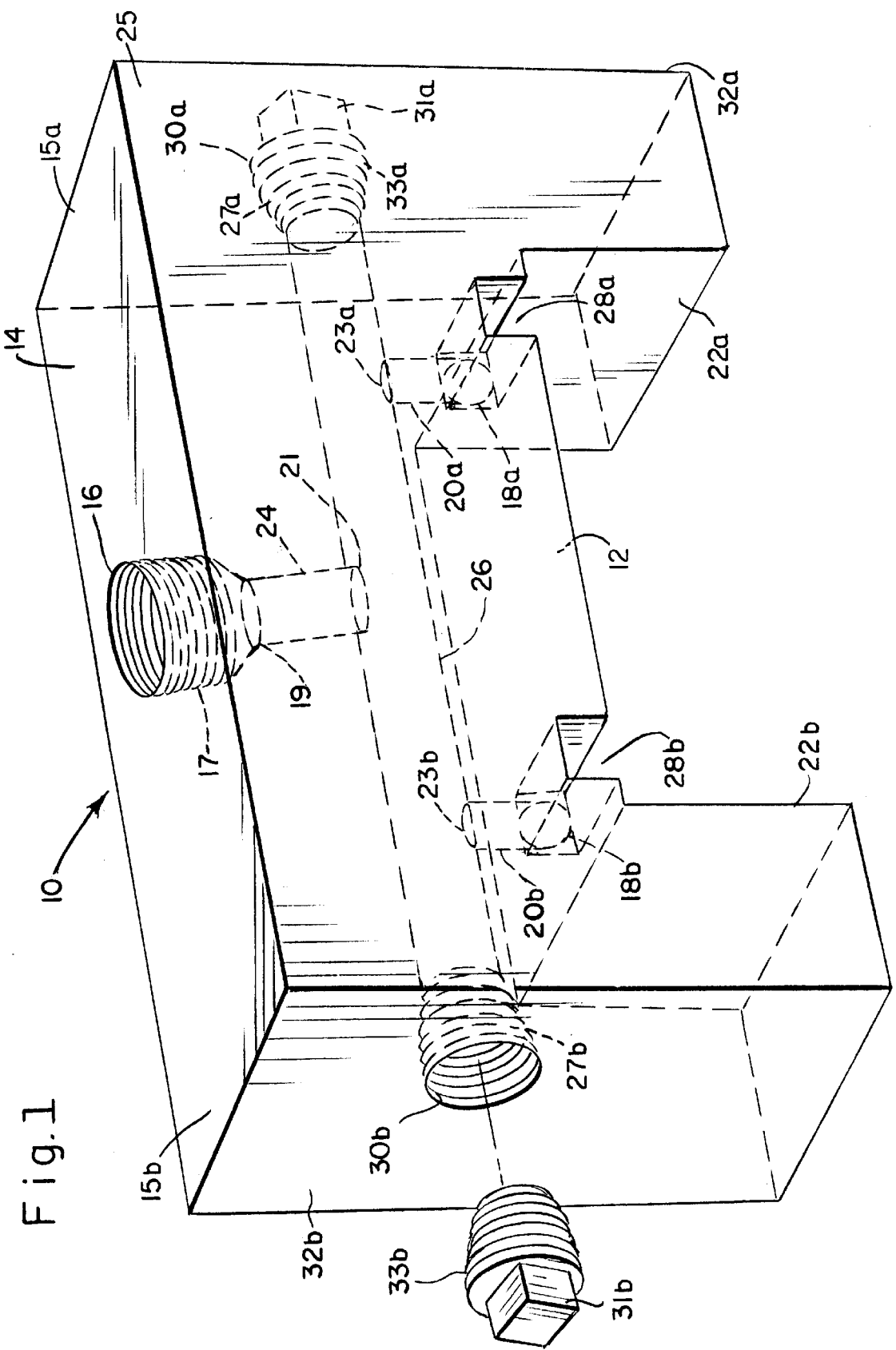
FIG. 1 is a three dimensional, partially invisible side view of an embodiment of an applicator as contemplated by this invention.

With reference to FIG. 1, applicator 10 includes a first planar surface 12 having a length substantially the same as the width of the vertical surface of a glass block on which edges the streams of the sealant are to be applied. Applicator 10 includes also a second planar surface 14, provided with entrance orifice 16 which, when the applicator is in use (see FIG. 1), receives a sealant. As can be seen, entrance orifice 16 is enlarged to accommodate a sealant gun nozzle 35 (described below with respect to FIG. 2). Extending from entrance orifice 16 and to a substantial extent below second planar surface 14 is a cup shaped threaded enlarged chamber 17 to accommodate the aforesaid nozzle. At the bottom of enlarged chamber 17 is orifice 19, which is in flow communication with and forms one end of sealant receiving channel 24.

As illustrated for convenience, second planar surface 14 is parallel to first planar surface 12. First vertical surface 32a and second vertical surface 32b extend substantially downwardly, respectively from first end 15a and second end 15b of second planar surface 14. Sealant flow communication is further achieved by providing receiving channel 24 whose end opposite that of orifice 19 terminates in orifice 21 in flow communication with the approximate central portion of connecting channel 26. Connecting channel 26 extends from first vertical surface 32a to second vertical surface 32b.

Extending in flow communicating relationship between connecting channel 26 and orifices for disposing streams of the sealant 18a and 18b are sealant delivering orifices 23a and 23b and delivering channels 20a and 20b. Grooves 28a and 28b are located at the intersection of first planar surface 12 and leading surface 25. Grooves 28a and 28b are in flow communication with orifices for disposing streams of sealant 18a and 18b. Grooves 28a and 28b accommodate the height and width of streams of the sealant disposed onto the edges of the glass block. At the ends of first planar surface 12, which length fits the width of the glass block surface on which the sealant is to be applied, there extend the third substantially vertical surface 22a and the fourth substantially vertical surface 22b, respectively. These third and fourth substantially vertical surfaces 22a and 22b act as further guides for the applicator, when the sealant is being applied, as they abut the horizontal surfaces of the glass block (perpendicular to the vertical surface on which the sealant is being applied). The distance of groove 28a from the third substantially vertical surface 22a and the distance of groove 28b from the fourth substantially vertical surface 22b is of course such that when the sealant is being dispensed from orifices 18a and 18b, the sealant is positioned accurately along the intended edges (or other desired location) of the glass block.

In certain preferred embodiments of this invention there are provided treaded closing caps 33a and 33b, as shown on FIG. 1, to close connecting channel 26 when the applicator 10 is in use. End portions 27a and 27b of connecting channel 26 are funnel shaped and threaded to accommodate closing caps 33a and 33b which are installed through end openings 30a and 30b of connecting channel 26. Closing cap 33a is shown on FIG. 1 installed. When the applicator is not in use, closing caps 33a and 33b can be removed from the applicator thereby providing access to connecting channel 26 for the purpose cleaning it. Closing caps 33a and 33b are threaded and have a funnel shape to fit end portions 27a and 27 b. They are further provided with square knobs 31a and 31b for easy tightening and removal from end portions of connecting channel 27a and 27b using a simple wrench or pliers. Closing caps 33a and 33b are preferably made of a metal such as steel. Other materials, of course, may be employed.

In certain embodiments of this invention entrance orifice 16 is substantially circular and orifices for disposing the sealant 18a and 18b are substantially oval. The applicator 10 is made of a material such as Teflon® or any other suitable material. The material chosen should be durable, not subject to chemical degradation by the used sealant easily slidable through low friction with the glass block and easily cleaned. Teflon has been found to be a preferred material thanks to its durability, which is particularly important with respect to metal nozzle 35 being attached within a threaded enlarged chamber 17 before each series of operations, and chemical resistance to silicone. Additionally Teflon has low friction with glass and silicone does not attach to it, making the cleaning process easy and silicone application on glass blocks smooth, as the channels and orifices do not become clogged. A coating of Teflon could be also provided on another material used to make the applicator.

Figure 2:
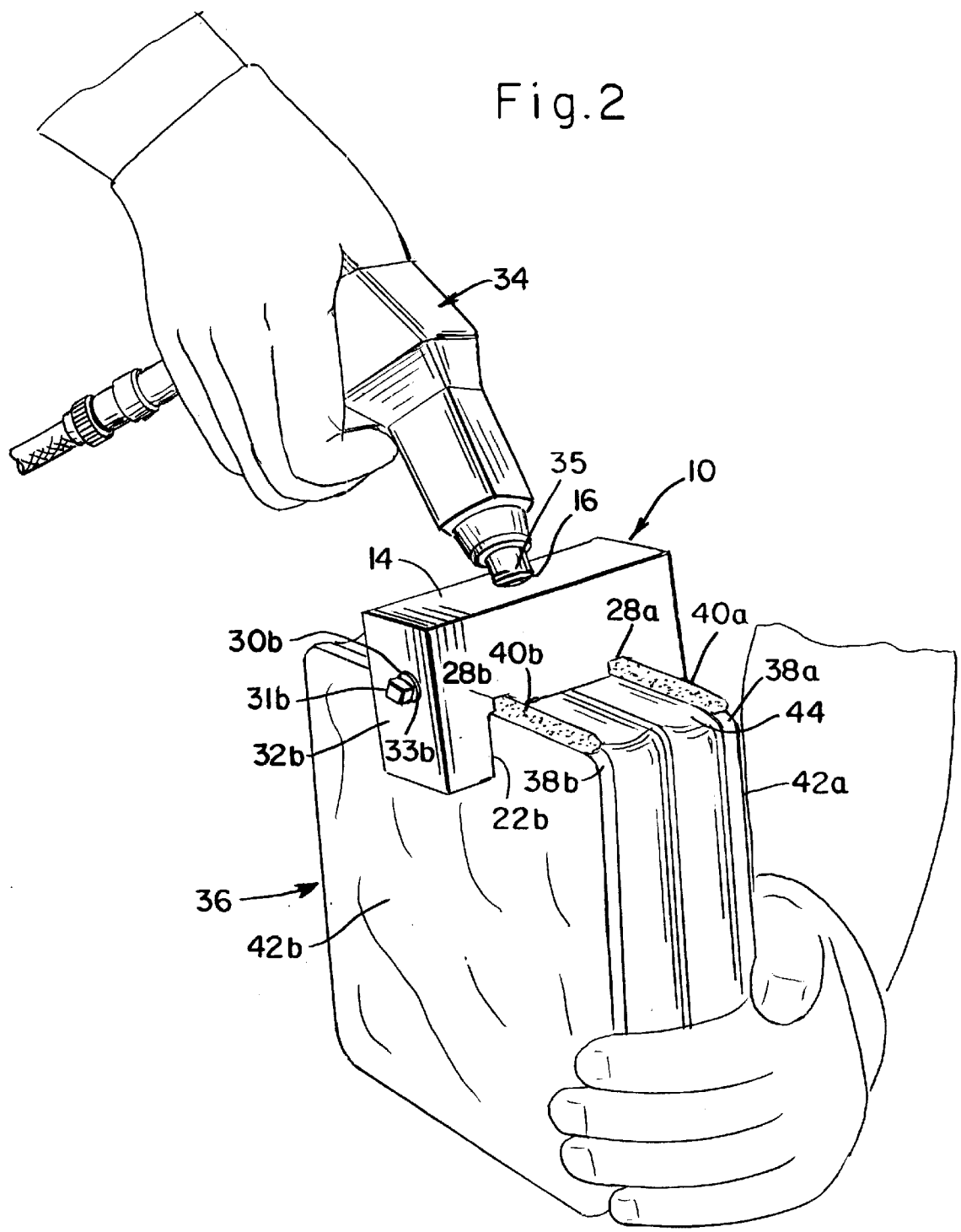
FIG. 2 is a three dimensional view of the applicator of FIG. 1 in operation.

The invention operates as follows:

As shown on FIG. 2, one of vertical surfaces 44 of glass block 36 is provided to have streams of sealant applied onto it. The applicator 10 is placed on glass block 36 in such a way that third and fourth substantially vertical surfaces 22a and 22b abut horizontal surfaces 42a and 42b of glass block 36, and first planar surface 12 rests on vertical surface 44 of glass block 36, which is one of the vertical surfaces of glass block 36, on which the sealant is to be applied. A conventional pump (not shown) and trigger gun 34 are used to supply the sealant. Trigger gun 34 enables the worker to control the speed and the volume of flow of the sealant. Nozzle 35 of trigger gun 34 is screwed in enlarged chamber 17 through entrance orifice 16, either separately from the gun and gun 34 is next attached to it, or being initially attached to gun 34. The sealant is dispensed into sealant receiving orifice 19, by manual manipulation of the trigger (not shown) of gun 34. When the sealant is silicone, such as GE (General Electric) Silicone, the pressure in the gun is set at from about 60 psi to about 100 psi. The sealant flows through receiving channel 24 to connecting channel 26 and from connecting channel 26 to the respective delivering channels 20a and 20b through sealant delivering orifices 23a and 23b. Enlarged chamber 17, sealant receiving orifice 19, receiving channel 24, connecting channel 26, sealant delivering orifices 23a and 23b, and delivering channels are shown in FIG. 1. As the sealant is being released into sealant receiving orifice 19, the worker simultaneously slides applicator along edges 38a and 38b of vertical surface 44 of glass block 36, on which the sealant is to be applied, in the direction opposite the already disposed sealant. As applicator 10 is being moved, the sealant is being released from orifices for dispensing the sealant 18a and 18b, shown on FIG. 1, through grooves 28a and 28b, shown on FIG. 1, onto and along edges 38a and 38b of vertical surface 44, in the form of streams 40a and 40b. The intended amount of sealant can be applied accurately at the intended location as the supply of sealant is controlled by the pressure in gun 34, use of the trigger (not shown) of gun 34, and the speed with which the worker moves applicator, using his skill, along edges 38a and 38b of the glass bock 36. After completing the process of dispensing the sealant on vertical surface 44 of glass block 36, the worker rotates glass block 36 over, in such a way as to provide the next vertical surface of glass block 36 accessible for the application of the sealant. Usually the sealant is applied on two perpendicular vertical surfaces of glass block and the vertical sides without the sealant are being sealed to vertical surfaces with a sealant already on them. This process continues until all glass blocks are sealed.

The method of this invention is useful for applying any sealant onto a vertical surface of a glass block. However, it is particularly useful for applying silicone. Applicator 10 can be easily delivered and carried on-site where there is a need to perform a sealing operation of glass blocks. It can be used for building standard glass walls as well as oddly shaped and oddly sized walls, and for repairing existing glass walls.

EXAMPLE

A series of glass blocks to be assembled into a wall are provided. The blocks have vertical surfaces with a width of 3⅛". With reference to FIGS. 1–2 the dimensions of planar surface 12 are 3"×1 5/16", to fit the width of the vertical surface on which the sealant is to be applied. The height of third and fourth substantially vertical surfaces 22a and 22b is about 1 inch, which is sufficient to bring the applicator into engagement with the horizontal surfaces of the glass block.

When the applicator is in use the pressure within it is from about 60 psi to about 100 psi. The distance of the central axis of orifices 18a and 18b and grooves 28a and 28b from the edges of first planar surface 12 with third and fourth substantially vertical surfaces 22a and 22b is about ¼ inch, which enables the worker to place the streams of the sealant precisely on the edges of the vertical surface of the glass block. Enlarged chamber 17 with its entrance orifice 16 is located substantially equally from first and second substantially vertical surfaces 32a and 32b, and substantially near the edge of second planar surface 14 that is opposite leading surface 25. Enlarged chamber 17 having a diameter of about ¾ inch NPT (National Pipe Thread) at entrance orifice 16 and a depth of about ¾ inch narrows to chamber orifice having a diameter of about ¼ inch NPT. Sealant receiving channel 24 has a diameter of about ¼ inch which ensures that the given amount of the sealant will be evenly distributed between sealant delivering channels 20a and 20b, each of which has a diameter of about ⅛ inch. To ensure smooth and steady flow of the sealant through the applicator, enlarged chamber 17, sealant receiving channel 24 and sealant delivering channels 20a and 20b are located along one central axis which is about 45° below second planar surface 14. End portions of connecting channel 27a and 27b are about ¼ inch NPT wide at the end openings 30*a* and 30*b* of connecting channel 26 to accommodate closing caps 33*a* and 33*b*. Grooves 28*a* and 28*b* are about ³⁄₁₆ inch deep, about ⅛ inch high and about ⅛ inch wide to accommodate the streams of the sealant after they leave orifices for disposing the sealant 18*a* and 18*b*, so that their shape is maintained while the applicator is being further moved along the vertical surface of the glass block. When these dimensions are employed in combination it has been found that with the type of glass block described, a proper amount of silicone sealant is applied using only routine skill of the person moving the applicator along the edge of the block during the application process. As different situations are faced it is understood by the skilled artisan that different dimensions will be employed to match the applicator to the blocks involved.

Once given the above disclosure, many other features, modifications and improvements will become apparent to the skilled artisan. Such other features, modifications, and improvements are therefore considered to be part of this invention, the scope of which is to be determined by the following claims:

We claim:

1. An applicator capable of continuously applying a stream of a sealant on one of four vertical surfaces of a glass block and along each of two opposing edge of a glass block comprising two horizontal surfaces and four vertical surfaces, wherein said edges are formed respectively by each horizontal surface and each vertical surface perpendicular to said each horizontal surface, comprising:
    a first planar surface having a first end and a second end, said first planar surface having length substantially the same as the width of each said vertical surface of said glass block to which the sealant is to be applied;
    a second planar surface parallel to said first planar surface, having a first end and a second end;
    an entrance orifice defined by said second planar surface, for receiving the source of the sealant;
    an enlarged chamber for accommodating the source of the sealant, extending from said entrance orifice substantially downwardly below said second planar surface;
    a sealant receiving orifice in flow communication with said enlarged chamber, opposite said entrance orifice;
    a first vertical surface extending substantially downwardly from said first end of said second planar surface;
    a second vertical surface extending substantially downwardly from said second end of said second planar surface;
    a connecting channel having a first end portion and a second end portion, extending from said first vertical surface to said second vertical surface;
    a connecting channel orifice, in flow communication with said connecting channel, substantially centrally located within said connecting channel;
    a sealant receiving channel extending from said sealant receiving orifice to said connecting channel orifice;
    at least two delivering channels extending outwardly from said connecting channel;
    at least two delivering orifices in flow communication with said two delivering channels;
    a leading surface extending substantially vertically and downwardly from said second planar surface and substantially perpendicular to said first and said second vertical surfaces;
    at least two grooves in flow communication with said at least two delivering orifices, said two grooves defined by said first planar surface and said leading surface, said grooves so located with respect of said first end and said second end of said first planar surface, that the distance of each said groove respectively from said first end and said second end of said first planar surface is substantially equal to the distance of the plane of each of the horizontal surface of said glass block from the plane of the edge most near it on which the sealant is to be applied, parallel to said horizontal surface; and
    a third and a fourth substantially vertical surface respectively extending downwardly from said first end of said first planar surface and said second end of said first planar surface, to guide said applicator along said opposing edges of said glass block, as to accurately position said stream of the sealant at the intended location of application by manually sliding said applicator along said each two opposing edges of said glass block.

2. An applicator according to claim 1, wherein said enlarged chamber is threaded.

3. An applicator according to claim 1, wherein said entrance orifice is substantially circular and said at least two delivering orifices are substantially oval.

4. An applicator according to claim 1, wherein said first end portion and said second end portions are funnel shaped.

5. An applicator according to claim 1, further comprising a first and a second removable closing caps fitted respectively into said first end portion and said second end portion.

6. An applicator according to claim 5, wherein said first and said second removable closing caps are threaded and wherein said first end portion and said second end portion of said connecting channel are threaded.

7. An applicator according to claim 6, wherein said first end portion and said second end portion of said connecting channel are funnel shaped and wherein said first closing cup and said second closing cup are funnel shaped to fit respectively within said first end portion and said second end portion of said connecting channel.

8. An applicator according to claim 5,6 or 7 wherein said first and said second removable closing caps include knobs for tightening and removal of said first and said second removable closing cups from said first and said second end portions.

9. A method for applying a stream of a sealant on one of four vertical surfaces of a glass block and a long each of two opposing edges of a glass block comprising two horizontal surfaces and four vertical surfaces, wherein said edges are formed by respectively each horizontal surface and each vertical surface perpendicular to said each horizontal surface, comprising the steps of:
    a) providing said one vertical surface of a glass block, on which the sealant is to be applied;
    b) providing a source of the sealant;
    c) providing an applicator, comprising a first planar surface having a first end and a second end; a second planar surface parallel to said first planar surface, said second planar surface having a first end and a second end; a leading surface extending substantially vertically and downwardly from said second planar surface and substantially perpendicular to said first and second vertical surfaces, a first vertical surface extending substantially downwardly from said first end of said second planar surface, a second vertical surface extending substantially downwardly from said second end of said second planar surface; wherein said first planar surface and said leading surface define at least two grooves that are in flow communication with at least two orifices for dispensing the sealant onto said one vertical surface of the glass block, said grooves so located with respect to said first end and said second end of said first planar surface, that the distance of each groove respectively from said first end and said second end of said first planar surface is substantially equal to the distance of the plane of each horizontal surface of said glass block from the plane of the edge most near it and parallel to said horizontal surface; an enlarged chamber for accommodating the source of the sealant, said enlarged chamber in fluid communication with an entrance orifice defined by said second planar surface and with a sealant receiving orifice that is connected to said at least two orifices for dispensing the sealant through a sealant receiving channel, a connecting channel and at least two delivering channels; said applicator comprising a third and a fourth substantially vertical surface respectively extending downwardly from said first end of said first planar surface and said second end of said first planar surface, to guide said applicator along said opposing edges of said glass block;

c) coupling the source of the sealant to said enlarged chamber; and d) dispensing the sealant into said sealant receiving orifice and simultaneously manually sliding the applicator along said opposing edges of said glass block, thereby accurately positioning the correct amount of the sealant along said two opposing edges of said glass block.

* * * * *

UNITED STATES PATENT AND TRADEMARK OFFICE
CERTIFICATE OF CORRECTION

PATENT NO.    : 6,251,324 B1
DATED         : June 26, 2001
INVENTOR(S)   : Forte et al.

It is certified that error appears in the above-identified patent and that said Letters Patent is hereby corrected as shown below:

Column 7,
Line 26, delete "edge" and insert -- edges --.

Column 8,
Lines 27 and 37, delete "funnel shaped" and insert -- funnel-shaped --.

Signed and Sealed this

Thirty-first Day of December, 2002

JAMES E. ROGAN
*Director of the United States Patent and Trademark Office*